США009463674B1

(12) United States Patent
He et al.

(10) Patent No.: US 9,463,674 B1
(45) Date of Patent: Oct. 11, 2016

(54) REAL-TIME DETECTION OF WHEEL ANOMALIES

(71) Applicant: International Business Machines Corporation, Armonk, NY (US)

(72) Inventors: Shi Wen He, Shanghai (CN); Jun Liao, Shanghai (CN); Rui Shen, Shanghai (CN); Dan Dan Wang, Shanghai (CN); Wen Bao Yin, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/996,311

(22) Filed: Jan. 15, 2016

(51) Int. Cl.
  *B60C 23/00* (2006.01)
  *B60C 23/04* (2006.01)
(52) U.S. Cl.
  CPC ................ *B60C 23/0486* (2013.01)
(58) Field of Classification Search
  CPC .................................... B60C 23/0486
  USPC ................................... 340/442, 443
  See application file for complete search history.

(56) References Cited

U.S. PATENT DOCUMENTS

| | | | |
|---|---|---|---|
| 4,936,138 A * | 6/1990 | Cushman | G01M 17/025 |
| | | | 73/146 |
| 6,014,599 A * | 1/2000 | Inoue et al. | 701/29 |
| 7,205,886 B2 | 4/2007 | Kin | |
| 7,640,139 B2 | 12/2009 | Sahara et al. | |
| 8,869,618 B2 | 10/2014 | Wakao | |
| 8,948,967 B2 | 2/2015 | Championnet | |
| 2006/0265154 A1 * | 11/2006 | Potts | G01M 17/02 |
| | | | 702/56 |
| 2012/0167687 A1 | 7/2012 | Wakao | |
| 2013/0278771 A1 | 10/2013 | Magoun et al. | |

FOREIGN PATENT DOCUMENTS

| | | | |
|---|---|---|---|
| CN | 2543744 Y | 4/2003 | |
| CN | 2752091 Y | 1/2006 | |
| CN | 102498000 A | 6/2012 | |

(Continued)

OTHER PUBLICATIONS

"A device of vehicle turn over alert according to Tyre Pressure", An IP.com Prior Art Database Technical Disclosure, Authors et. al.: Disclosed Anonymously, IP.com No. 000220980, Publication Date: Aug. 17, 2012,9 pages, <http://ip.com/IPCOM/000220980>.

*Primary Examiner* — Brent Swarthout
(74) *Attorney, Agent, or Firm* — Steven L. Fisher-Stawinski

(57) ABSTRACT

A computer-implemented method includes receiving, by one or more sensors, data for one or more cycles, each of the one or more cycles including one or more slots. The computer-implemented method further includes combining the one or more slots from each of the one or more cycles into a combined slot group. The computer-implemented method further includes converting the combined slot group into a converted slot group. The computer-implemented method further includes monitoring the converted slot group for an anomaly. The computer-implemented method further includes, responsive to the anomaly: Comparing the anomaly to one or more known anomalies to determine a correlation between the anomaly and the one or more known anomalies, and determining the anomaly location. The computer-implemented method further includes reporting a problem condition based on at least one of the correlation and the anomaly location. A corresponding computer system and computer program product are also disclosed.

15 Claims, 3 Drawing Sheets

(56) References Cited

FOREIGN PATENT DOCUMENTS

| CN | 102498000 B | 7/2014 |
| EP | 2460674 A1 | 6/2012 |
| JP | 2006224757 A | 8/2006 |
| WO | 2011030700 A1 | 3/2011 |
| WO | 2015100425 A1 | 7/2015 |

\* cited by examiner

REAL-TIME DETECTION OF WHEEL ANOMALIES

BACKGROUND

The present invention relates generally to monitoring systems and in particular to monitoring systems for real-time detection of wheel anomalies.

The dynamic behavior of a pneumatic tire is closely connected to its inflation pressure. Key factors, such as braking distance and lateral stability require the inflation pressures to be adjusted and maintained as specified by the vehicle manufacturer. If not properly maintained, extreme under-inflation may lead to thermal and mechanical overload caused by overheating and subsequent, sudden destruction of the tire itself. Additionally, fuel efficiency and tire wear are severely affected by under-inflation. Due to the influence that tire pressure has on vehicle safety and efficiency, vehicles are generally equipped with a tire-pressure monitoring system (TPMS). A TPMS is an electronic system that monitors the air pressure inside the pneumatic tires. A TPMS may report real-time tire-pressure information to the driver via a gauge, pictogram display, or warning indication symbol. More specifically, a TPMS may be divided into two categories: direct (dTPMS) and indirect (iTPMS). However, these current systems can be costly and may only detect tire air pressure and temperature.

SUMMARY

A computer-implemented method includes receiving, by one or more sensors, data for one or more cycles, each of the one or more cycles including one or more slots. The computer-implemented method further includes combining the one or more slots from each of the one or more cycles into a combined slot group. The computer-implemented method further includes converting the combined slot group into a converted slot group. The computer-implemented method further includes monitoring the converted slot group for an anomaly. The computer-implemented method further includes, responsive to the anomaly: Comparing the anomaly to one or more known anomalies to determine a correlation between the anomaly and the one or more known anomalies, and determining the location of the anomaly. The computer-implemented method further includes reporting a problem condition based on at least one of the correlation and the location of the anomaly. A corresponding computer system and computer program product are also disclosed.

DETAILED DESCRIPTION

Figure 1:
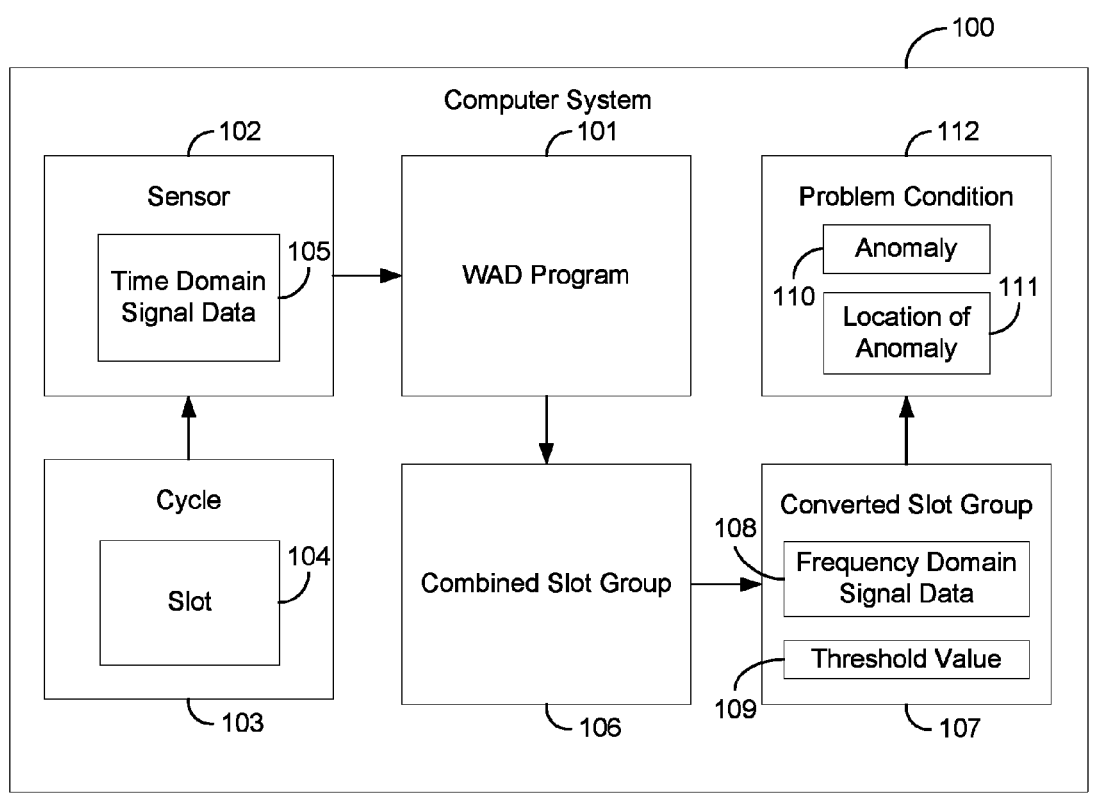
FIG. 1 is a block diagram of one embodiment of a computer system environment 100 suitable for operation in accordance with at least one embodiment of the invention.

Referring now to various embodiments of the invention in more detail, FIG. 1 is a block diagram of one embodiment of a computer system environment suitable for operation in accordance with at least one embodiment of the invention.

Within a computer system 100, a wheel anomaly detection ("WAD") program 101 may receive, by one or more sensors 102, data for one or more cycles 103. The one or more sensors 102 may include an angular sensor, acceleration sensor, vibration sensor, or more generally, any type of sensor that may be mounted to a wheel. At the onset, it should be appreciated that various embodiments of the invention are not limited to tires affixed to a wheel, and may be applied to any vehicle with wheels (e.g., train) and any mechanism with rotating components (e.g., wheels, gears, and shafts, etc.). A cycle 103 may be understood as any complete round or series of occurrences that repeats or is repeated. More specifically, a cycle 103 may be the completion of a 360 degree rotation of a wheel. Each of the one or more cycles 103 may include one or more slots 104. A slot 104 may be understood as a place or position in an organization, arrangement, or sequence. More specifically, the one or more slots 104 may include time domain signal data 105 for a predetermined fraction of any of the one or more cycles 103.

The WAD program 101 may further combine the one or more slots 104 from each of the one or more cycles 103 into a combined slot group 106. Here, the combined slot group 106 may include time domain signal data 105 combined from the one or more slots 104 from each of the one or more cycles 103. Time domain signal data 105 may be understood as a measurement of a signal over time. The WAD program 101 may further convert the combined slot group 106 into a converted slot group 107. Here, the WAD program 101 may transform the time domain signal data 105 to frequency domain signal data 108 to yield the converted slot group 107. The time domain signal data 105 may be transformed to frequency domain signal data 108 by any known transformation methods, such as fast Fourier transform ("FFT"). Each converted slot group 107 may be associated with a threshold value 109.

The WAD program 101 may further monitor the converted slot group 107 for an anomaly 110. An anomaly 110 may occur if at least one quantity associated with the converted slot group 107 exceeds the threshold value 109. The WAD program 101 may further, responsive to the anomaly 110, compare the anomaly 110 to one or more known anomalies to determine a correlation between the anomaly 110 and the one or more known anomalies. The one or more known anomalies may be stored in a database as locally stored data on a user device, such as a laptop or mobile device, on a network, such as the Internet, or in a remote location, such as a server. The WAD program 101 may further determine the location 111 of the anomaly 110. The WAD program 101 may further report a problem condition 112 based on at least one of the correlation of the anomaly 110 with a known anomaly and the location 111 of the anomaly 110.

Figure 2:
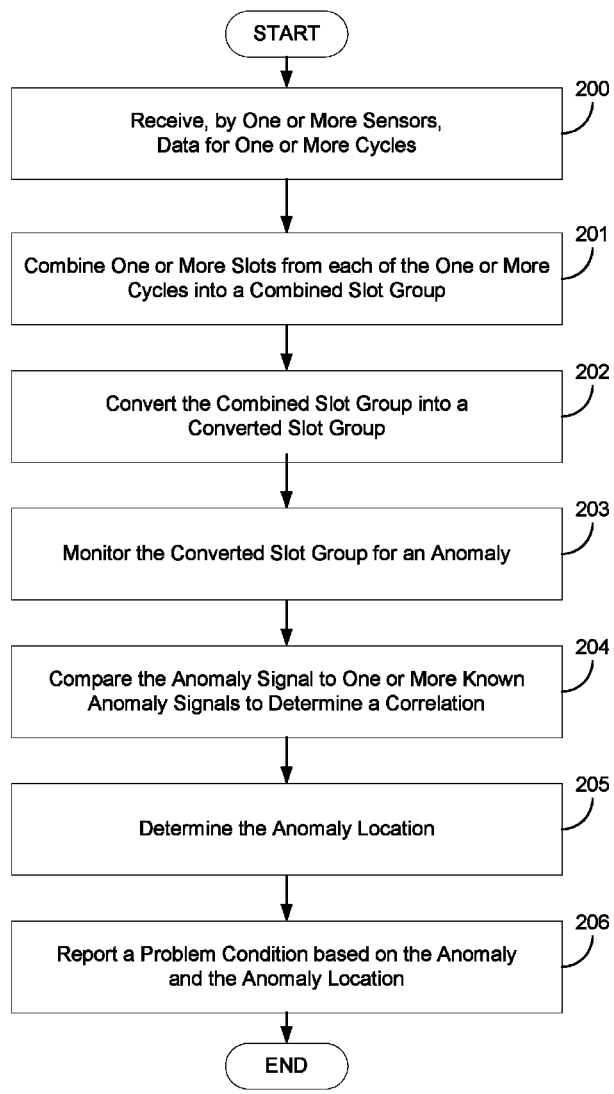
FIG. 2 is a flow chart diagram depicting the wheel anomaly detection program in accordance with at least one embodiment of the invention.

FIG. 2 is a flow chart diagram depicting the WAD program in accordance with at least one embodiment of the invention. According to the depicted embodiment, at step 200, the WAD program 101 may receive, by one or more sensors 102, data for one or more cycles 103. Generally, the one or more sensors 102 may be components of a monitoring system for monitoring a wheel and may include any known types of sensors. More specifically, in one embodiment of the invention, the one or more sensors 102 may include an angular sensor and an acceleration sensor. In another embodiment of the invention, the one or more sensors 102 may include an angular sensor and a vibration sensor.

Additionally, each of the one or more cycles 103 may include one or more slots 104. The one or more slots 104 may include time domain signal data 105 for a predetermined fraction of any of the one or more cycles 103. Here, an angular sensor (i.e., angular position sensor, rotary sensor) may be used to measure time domain signal data 105 for each slot 104 of a cycle 103. An angular sensor measures the relation by which any position with respect to any other position is established. More specifically, the angular sensor may calculate the orientation of an object (e.g., wheel) with respect to a specified reference position (e.g., point of contact of the wheel with the road surface) as expressed by the amount of rotation necessary (i.e., predetermined fraction of a cycle 103) to change from one orientation (slot 104) to the other (slot 104) about a specified axis.

In one embodiment of the invention, the WAD program 101 may also receive data from an acceleration sensor for one or more wheels. For example, the WAD program 101 may receive time domain signal data 105 from an accelerometer for one or more slots 104 of one or more cycles 103. The time domain signal data 105 for each slot 104 of each cycle 103 may be stored in a database. The accelerometer may be any generally known type of accelerometer, including, but not limited to a Piezoelectric accelerometer or Piezoresistive accelerometer. An accelerometer is a type of sensor 102 that measures vibrations or velocities. Here, the rotation of the wheel will cause the accelerometer to experience a force. As the wheel turns, a periodic vibration may be observed at the sensor 102 for the one or more slots 104 of the one or more cycles 103. The output of time domain signal data 105 from each sensor 102 may then be used to analyze the intensity and frequency of the vibrations of the wheel, which may ultimately contribute to the determination of the condition of the wheel.

At step 201, the WAD program 101 may combine the one or more slots 104 from each of the one or more cycles 103 into a combined slot group 106. Here, the WAD program 101 may combine the time domain signal data 105 received by the accelerometer for the same slot 104 of each cycle 103. For example, the WAD program 101 may receive time domain signal data 105 for three cycles 103 of a wheel, where each cycle 103 may include 36 slots 104, and each slot 104 corresponding to 10 degrees. The WAD program 101 may combine the time domain signal data 105 received by the accelerometer for the slot 104 "0 to 10 degrees" for three cycles 103 of a wheel. The WAD program 101 may combine the time domain signal data 105 received by the accelerometer for the slot 104 "10 to 20 degrees" for the same three cycles 103 of the wheel. The WAD program 101 may combine the time domain signal data 105 received by the accelerometer for the slot 104 "20 to 30 degrees" for the same three cycles 103 of the wheel. The WAD program 101 may continue to combine the time domain signal data 105 received by the accelerometer for each additional slot 104 remaining for the same three cycles 103 of the wheel.

At step 202, the WAD program 101 may convert the combined slot group 106 into a converted slot group 107. In one embodiment of the invention, the WAD program 101 may transform the time domain signal data 105 received by the accelerometer to frequency domain signal data 108 to yield the converted slot group 107. The WAD program 101 may transform the time domain signal data 105 to frequency domain signal data 108 by any known transformation methods, such as fast Fourier transform. FFT is a class of algorithms for computing the discrete Fourier transform ("DFT"). The DFT converts a finite list of equally spaced samples of a function into a list of coefficients of a finite combination of complex sinusoids, ordered by their frequencies. In other words, the DFT converts a sample function from its original form (e.g., time domain) to a representation in the frequency domain.

For example, the WAD program 101 may use the Cooley-Tukey algorithm. Here, the WAD program 101, via the Cooley-Tukey algorithm, may compute the DFT for each combined slot group 106 for one or more cycles 103 of a wheel. More specifically, the WAD program 101 may convert the accelerometer time domain signal data 105 of each combined slot group 106 to a converted slot group 107 consisting of frequency domain signal data 108.

At step 203, the WAD program 101 may monitor the converted slot group 107 for an anomaly 110. Each converted slot group 107 may be associated with a threshold value 109. The threshold value 109 may generally be understood as frequency domain signal data 108 for one or more slots 104 when no anomaly 110 is present. More specifically, the threshold value 109 for a converted slot group 107 may be determined by calculating the power to frequency ratio for various defined speeds (e.g., 20 miles per hour, 30 miles per hour, etc.) of a wheel over a defined time period (e.g., 10 seconds, 30 seconds, etc.). The threshold value 109 for each converted slot group 107 for the various defined speeds over a defined time period may be stored in a database. Thus, an anomaly 110 may occur if at least one quantity (e.g., power to frequency ratio) associated with the converted slot group 107 exceeds the threshold value 109 for a defined speed for a defined time period. More specifically, an anomaly 110 may occur if the radius (energy) of the frequency exceeds the threshold frequency value for a converted slot group 107.

For example, the WAD program 101 may receive time domain signal data 105 for three cycles 103 of four individual wheels, where each cycle 103 includes 36 slots 104, and each slot 104 includes time domain signal data 105 for a 10 degree fraction of the wheel. For each wheel, the WAD program 101 may combine the time domain signal data 105 for the slot 104 "0 to 10 degrees" for the three cycles 103 into a combined slot group 106. For each wheel, the WAD program 101 may combine the time domain signal data 105 for the slot 104 "10 to 20 degrees" for the same three cycles 103 into a combined slot group 106. For each wheel, the WAD program 101 may combine the time domain signal data 105 for the slot 104 "20 to 30 degrees" for the same three cycles 103 into a combined slot group 106. The WAD program 101 may combine the time domain signal data 105 for each subsequent "10 degree" slot 104 of the remaining 33 slots 104 for the same three cycles 103. The WAD program 101 may convert each combined slot group 106 consisting of time domain signal data to a converted slot group 107 consisting of frequency domain signal data 108.

When an anomaly signal 110 is detected for one or more converted slot groups 107, the WAD program 101 may check the frequency domain signal data 108 of the corresponding converted slot group 107 for each wheel for a subsequent defined time period. For example, if an anomaly 110 has been detected in any wheel for the slot 104 "40 to 50 degrees," the WAD program 101 may check frequency domain signal data 108 of the corresponding converted slot group 107 (e.g., slot "40 to 50 degrees") for each wheel. The WAD program 101 may further check frequency domain signal data 108 of the corresponding converted slot group 107 for each wheel for one or more cycles 103 over a defined time period (e.g., 10 seconds, 20 seconds, etc.). The WAD program 101 may further check frequency domain signal data 108 of the corresponding converted slot group 107 for each wheel for a defined speed (e.g., 20 miles per hour, 40 miles per hour, etc.) If each corresponding converted slot group 107 for each wheel has the same anomaly 110 (i.e., the same frequency domain signal data) during the same time period (e.g., 10 seconds) and at the same speed (e.g., 40 miles per hour), the cause of the anomaly 110 may simply be due to a change in the road surface or road surface conditions. However, if an anomaly 110 has not occurred at the corresponding converted slot group 107 for each wheel (i.e., different frequency domain signal data) during the same time period (e.g., 10 seconds) and at the same speed (e.g., 40 miles per hour), then an anomaly 110 for the converted slot group 107 having frequency domain signal data 108 above the threshold value 109 may be confirmed.

At step 204, responsive to the anomaly signal 110, the WAD program 101 may compare the anomaly signal 110 to one or more known anomaly signals to determine a correlation between the anomaly signal 110 and the one or more known anomaly signals. A known anomaly signal may be frequency signal data based on different possible wheel problems for a defined speed. For example, a possible known anomaly signal for a nail in a tire may produce frequency signal data of 25 hertz (Hz) when a vehicle is moving 20 miles per hour and frequency signal data of 45 hertz (Hz) when a vehicle is moving 30 miles per hour. In another example, a possible known anomaly signal for wearing of the inside of a tire may produce frequency signal data of 20 hertz (Hz) when a vehicle is moving 30 miles per hour and 45 hertz (Hz) when a vehicle is moving 45 miles per hour. In yet another example, a possible known anomaly signal for a hole in tire may produce frequency signal data of 30 hertz (Hz) when a vehicle is moving 40 miles per hour and frequency signal data of 60 hertz (Hz) when a vehicle is moving 55 miles per hour. Thus, the WAD program 101 may compare the anomaly signal 110 (i.e., frequency domain signal data above a threshold value) to one or more known anomaly signals to identify the possible cause of the anomaly signal 110.

At step 205, the WAD program 101 may determine the location 111 of the anomaly 110. The WAD program 101 may determine the location 111 of the anomaly 110 based on the distance (degrees) from which each slot 104 of the converted slot group 107 lies from a reference position (e.g., road surface). For example, the WAD program 101 may receive frequency domain signal data 108 above the threshold value 109 for the passenger side rear wheel of a vehicle at slots 15 and 16 out of a possible 36 slots, where each slot includes a 10 degree fraction of the wheel. Thus, it may be determined that slots 15 and 16 of the wheel are located 150 to 160 degrees and 160 degrees to 170 degrees from the reference position, respectively. At step 206, the WAD program 101 may report a problem condition 112 based on at least one of the correlation between the anomaly signal 110 and one or more known anomalies and the location 111 of the anomaly.

Figure 3:
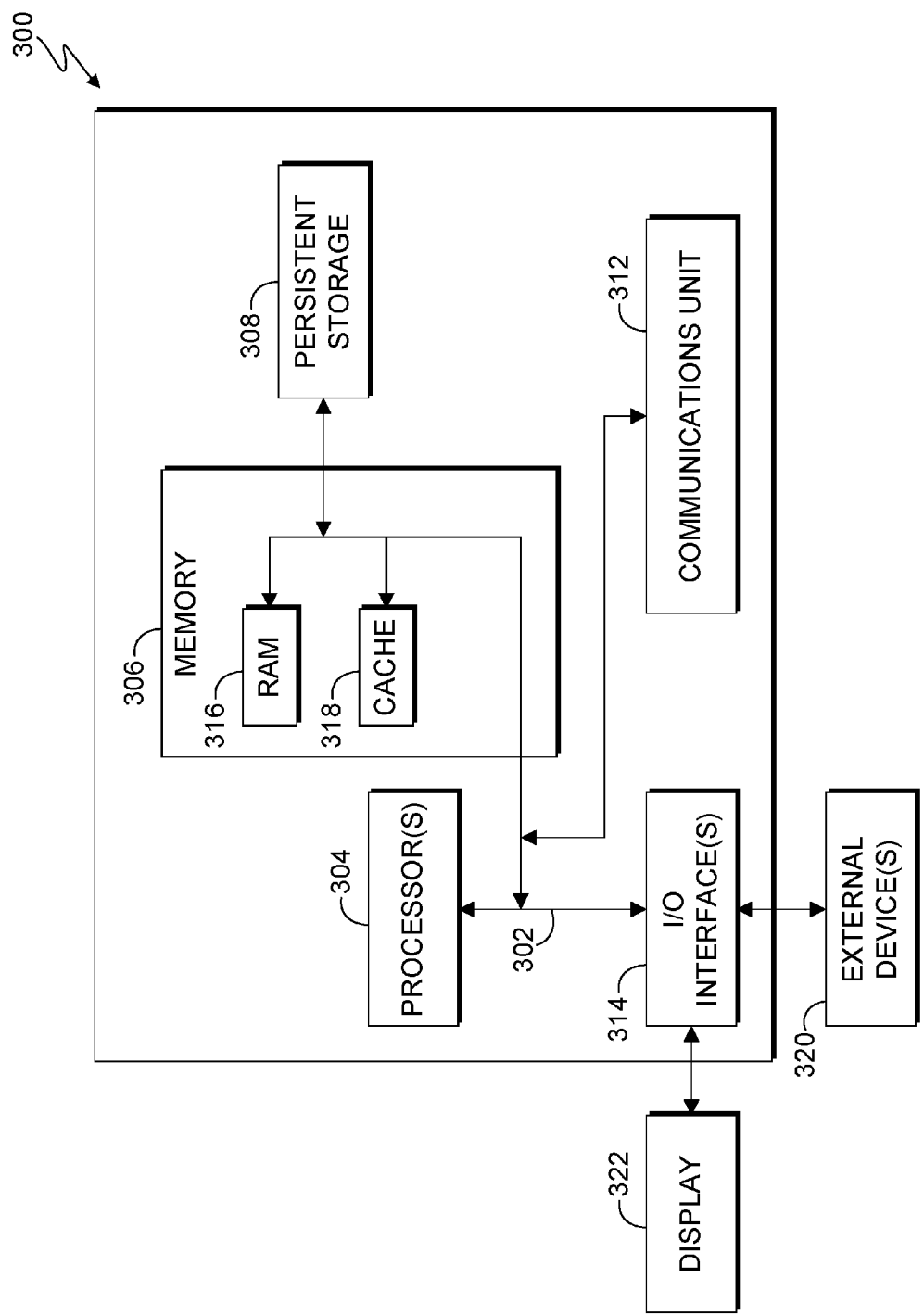
FIG. 3 is a block diagram of a computing apparatus 300 suitable for executing the wheel anomaly detection program in accordance with at least one embodiment of the invention.

FIG. 3 is a block diagram depicting components of a computer 300 suitable for executing the WAD program 101. FIG. 3 displays the computer 300, the one or more processor(s) 304 (including one or more computer processors), the communications fabric 302, the memory 306, the RAM 316, the cache 318, the persistent storage 308, the communications unit 312, the I/O interfaces 314, the display 322, and the external devices 320. It should be appreciated that FIG. 3 provides only an illustration of one embodiment and does not imply any limitations with regard to the environments in which different embodiments may be implemented. Many modifications to the depicted environment may be made.

As depicted, the computer 300 operates over a communications fabric 302, which provides communications between the computer processor(s) 304, memory 306, persistent storage 308, communications unit 312, and input/output (I/O) interface(s) 314. The communications fabric 302 may be implemented with any architecture suitable for passing data or control information between the processors 304 (e.g. microprocessors, communications processors, and network processors), the memory 306, the external devices 320, and any other hardware components within a system. For example, the communications fabric 302 may be implemented with one or more buses.

The memory 306 and persistent storage 308 are computer readable storage media. In the depicted embodiment, the memory 306 comprises a random access memory (RAM) 316 and a cache 318. In general, the memory 306 may comprise any suitable volatile or non-volatile one or more computer readable storage media.

Program instructions for the WAD program 101 may be stored in the persistent storage 308, or more generally, any computer readable storage media, for execution by one or more of the respective computer processors 304 via one or more memories of the memory 306. The persistent storage 308 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 306 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

The communications unit 312, in these examples, provides for communications with other data processing systems or devices. In these examples, the communications unit 312 may comprise one or more network interface cards. The communications unit 312 may provide communications through the use of either or both physical and wireless communications links. In the context of some embodiments of the present invention, the source of the various input data may be physically remote to the computer 300 such that the input data may be received and the output similarly transmitted via the communications unit 312.

The I/O interface(s) 314 allow for input and output of data with other devices that may operate in conjunction with the computer 300. For example, the I/O interface 314 may provide a connection to the external devices 320, which may be as a keyboard, keypad, a touch screen, or other suitable input devices. External devices 320 may also include portable computer readable storage media, for example thumb drives, portable optical or magnetic disks, and memory cards. Software and data used to practice embodiments of the present invention may be stored on such portable computer readable storage media and may be loaded onto the persistent storage 308 via the I/O interface(s) 314. The I/O interface(s) 314 may similarly connect to a display 322. The display 322 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by one or more sensors, time domain signal data for one or more cycles, each of said one or more cycles comprising one or more slots;
combining said one or more slots from each said one or more cycles into a combined slot group;
converting said combined slot group into a converted slot group, wherein converting said combined slot group into said converted slot group comprises transforming said time domain signal data to frequency domain signal data to yield said converted slot group;
monitoring said converted slot group for an anomaly;
responsive to said anomaly:
comparing said anomaly to one or more known anomalies to determine a correlation between said anomaly and said one or more known anomalies;
determining a location of said anomaly; and
reporting a problem condition based on at least one of said correlation and said location of said anomaly.

2. The computer-implemented method of claim 1, wherein said one or more slots comprise time domain signal data for a predetermined fraction of any said one or more cycles.

3. The computer-implemented method of claim 1, wherein said converted slot group is associated with a threshold value.

4. The computer-implemented method of claim 3, wherein said anomaly occurs if at least one quantity associated with said converted slot group exceeds said threshold value.

5. The computer-implemented method of claim 1, wherein said one or more sensors are components of a monitoring system for monitoring a wheel.

6. A computer program product, the computer program product comprising one or more computer readable storage media and program instructions stored on said one or more computer readable storage media, said program instructions comprising instructions to:
receive, by one or more sensors, time domain signal data for one or more cycles, each of said one or more cycles comprising one or more slots;
combine said one or more slots from each said one or more cycles into a combined slot group;
convert said combined slot group into a converted slot group, wherein said instructions to convert said combined slot group into said converted slot group further comprise instructions to transform said time domain signal data to frequency domain signal data to yield said converted slot group;
monitor said converted slot group for an anomaly;
responsive to said anomaly:
compare said anomaly to one or more known anomalies to determine a correlation between said anomaly and said one or more known anomalies;
determine a location of said anomaly; and
report a problem condition based on at least one of said correlation and said location of said anomaly.

7. The computer program product of claim 6, wherein said one or more slots comprise time domain signal data for a predetermined fraction of any said one or more cycles.

8. The computer program product of claim 1, wherein said converted slot group is associated with a threshold value.

9. The computer program product of claim 8, wherein said anomaly occurs if at least one quantity associated with said converted slot group exceeds said threshold value.

10. The computer program product of claim 6, wherein said one or more sensors are components of a monitoring system for monitoring a wheel.

11. A computer system, the computer system comprising:
one or more computer processors;
one or more computer readable storage media;
computer program instructions;
said computer program instructions being stored on said one or more computer readable storage media;
said computer program instructions comprising instructions to:
receive, by one or more sensors, time domain signal data for one or more cycles, each of said one or more cycles comprising one or more slots;
combine said one or more slots from each said one or more cycles into a combined slot group;
convert said combined slot group into a converted slot group, wherein said instructions to convert said combined slot group into said converted slot group further comprise instructions to transform said time domain signal data to frequency domain signal data to yield said converted slot group;
monitor said converted slot group for an anomaly;
responsive to said anomaly:
compare said anomaly to one or more known anomalies to determine a correlation between said anomaly and said one or more known anomalies;
determine a location of said anomaly; and
report a problem condition based on at least one of said correlation and said location of said anomaly.

12. The computer system of claim 11, wherein said one or more slots comprise time domain signal data for a predetermined fraction of any said one or more cycles.

13. The computer system of claim 11, wherein said converted slot group is associated with a threshold value.

14. The computer system of claim 13, wherein said anomaly occurs if at least one quantity associated with said converted slot group exceeds said threshold value.

15. The computer system of claim 11, wherein said one or more sensors are components of a monitoring system for monitoring a wheel.

* * * * *